United States Patent
Kollep et al.

(10) Patent No.: US 6,857,353 B2
(45) Date of Patent: Feb. 22, 2005

(54) CARTRIDGE EJECTION DEVICE

(75) Inventors: Alexandre Kollep, Lutry (CH); Daniel Fischer, Romanshorn (CH); Mischa Stieger, St.-Gallen (CH)

(73) Assignee: Nestec S.A., Vevey (CH)

( * ) Notice: Subject to any disclaimer, the term of this patent is extended or adjusted under 35 U.S.C. 154(b) by 123 days.

(21) Appl. No.: 10/134,075

(22) Filed: Apr. 26, 2002

(65) Prior Publication Data

US 2002/0124736 A1 Sep. 12, 2002

Related U.S. Application Data

(63) Continuation of application No. PCT/EP00/09514, filed on Sep. 28, 2000.

(30) Foreign Application Priority Data

Oct. 28, 1999 (EP) .......................................... 99121440.4

(51) Int. Cl.[7] ................................................ A47J 31/00
(52) U.S. Cl. ...................................... 99/289 R; 99/295
(58) Field of Search ............................... 99/289 R, 295, 99/302 R

(56) References Cited

U.S. PATENT DOCUMENTS

| 3,470,812 A | 10/1969 | Levinson | 99/295 |
| 5,794,519 A | 8/1998 | Fischer | 99/295 |
| 6,026,732 A | 2/2000 | Kollep et al. | 99/295 |

FOREIGN PATENT DOCUMENTS

| EP | 0 512 468 B1 | 11/1992 |
| EP | 0 555 775 A1 | 8/1993 |
| FR | 2 745 995 | 9/1997 |
| WO | WO 01/15581 A1 | 3/2001 |

*Primary Examiner*—Reginald L. Alexander
(74) *Attorney, Agent, or Firm*—Winston & Strawn LLP

(57) ABSTRACT

A device for ejecting a cartridge of a coffee machine having a jaw with a fixed part and a moving part, the jaw parts forming, in the closed position, a housing for the cartridge on the front of the said jaw, the moving part being mounted so that it can rotate on the rear of the fixed part, the device comprising, on the fixed part, in the region of the cartridge housing, an ejector and a pulling arm mounted on the moving part above the axis of rotation of the moving part with, at the end of the arm, a first pin designed to collaborate with catch members of the ejector.

23 Claims, 3 Drawing Sheets

CARTRIDGE EJECTION DEVICE

CROSS-REFERENCE TO RELATED APPLICATIONS

The present application is a continuation of the U.S. national stage designation of International Application PCT/EP00/09514, filed Sep. 28, 2000, the content of which is expressly incorporated herein by reference thereto.

FIELD OF THE INVENTION

The present invention relates to a device for ejecting cartridges in a coffee machine comprising a jaw with a fixed part and a moving part.

BACKGROUND OF THE INVENTION

Systems that allow the ejection of cartridges at the end of extraction in coffee machines comprising a jaw are known. The principle is based on the presence of an ejector in the lower part of the jaw and the pivoting of the said ejector to remove the cartridge extracted, when the said jaw opens. The devices of the state of the art have an axis of rotation of the ejector that is too far away from the portion of coffee to be removed, which leads to the said portion of coffee being catapulted and, in falling, dirtying the machine, in the case of the extraction of a closed cartridge which opens under the effect of the rise in pressure during extraction.

SUMMARY OF THE INVENTION

The invention relates to a food dispenser for extracting a substance for preparing a fluid food product, such as a beverage, in which case the substance includes a beverage component. First and second jaws of the dispenser are movably connected together. One of the jaws can be substantially fixed against rotation. The jaws have an open position for receiving the substance between the jaws. The jaws also have a closed position in which the jaws cooperatively define an extraction cavity about the substance at an extraction location between the jaws. The extraction cavity is configured for feeding a fluid to the substance and extracting a mixture of the fluid and the substance. An ejector is operatively associated with the jaws for ejecting the substance from the extraction cavity location when the jaws are moved from the closed to the open position. The ejector tilts about a tilt axis that is sufficiently close to the extraction cavity for ejecting the substance from the extraction cavity substantially without catapulting the substance when the jaws are moved from the closed to the open position. Preferably, the tilt axis is spaced from the center of the extraction cavity by a distance of less then about the length of the extraction cavity in the direction of said distance. The first and second jaws can be pivotally connected for pivoting about a jaw pivot axis, with the tilt axis being disposed closer than about half of the distance between the center of the extraction chamber and the pivot axis.

In the preferred embodiment, the jaws in the open position are configured for receiving a cartridge that contains the substance. The extraction cavity is configured for receiving the cartridge at the extraction location, and the ejector comprises a cartridge ejector configured for ejecting the cartridge in response to movement of the jaws from the closed to the open position.

The ejector is preferably connected with the first jaw for tilting with respect thereto for ejecting the substance. Preferably, the dispenser comprises a ramp adjacent the ejector and associated therewith for receiving and directing the ejected substance and directing to a disposal location. Also, the ejector is preferably pivotally attached to the first jaw for tilting. In this embodiment, a linkage is connected with the second jaw and the ejector for causing the ejector to move for ejecting the cartridge when the second jaw is moved with respect to the first jaw to the open position. The first and second jaws are pivotally connected together in this embodiment at a jaw pivot axis, and the ejector is pivotally connected to the first jaw for pivoting about an axis disposed towards the jaw pivot axis from the extraction location. The ejector is connected with the first jaw for tilting with respect thereto substantially about a tilt axis that is sufficiently close to the extraction cavity for ejecting the substance without catapulting the substance. Preferably, the tilt axis is spaced from the center of the extraction cavity by a distance of less then about the length of the extraction cavity in the direction of said distance.

Preferably, the jaws include a chamber wall defining the extraction chamber. The ejector has an ejector wall disposed outside the chamber wall in the closed position for positioning the substance in the extraction location with the jaws in the open position. The shape of the ejector wall preferably substantially corresponds to the chamber wall and can be arcuate.

To extract a fluid food product from the extraction chamber, the ejector device preferably has raised and recessed elements for extracting the mixture from a cartridge in the extraction chamber.

The preferred embodiment of the ejector has an ejecting position for ejecting the substance, and a receiving position for receiving the substance. The ejector is operatively associated with the jaws such movement from the closed position of the jaws causes the ejector to move to the ejecting position, and further movement of the jaws to the open position causes the ejector to move to the receiving position.

Preferably, a linkage connected with the second jaw and the ejector causes the ejector to move for ejecting the cartridge when the second jaw is moved with respect to the first jaw to the open position. The preferred linkage is configured for causing the ejector to tilt for ejecting the cartridge when the second jaw is moved with respect to the first jaw to the open position. This linkage also includes an tilter portion, and the ejector comprises a catch member. The tilter portion and the catch are associated such that the tilter portion moves with respect to the catch member during preferably a first phase of the movement of the jaws from the closed position, and then comes into contact with the catch member during movement of the jaws from the closed to the open position to bias the catch member for causing the ejector to pivot to an ejecting position for ejecting the substance. The tilter portion disengages from the catch member upon further movement of the jaws from the closed position, causing the ejector to a receiving position for receiving the substance. The catch member is preferably substantially upright with respect to the first jaw, and the tilt of the ejector is sufficient for causing the substance to slide out from the extraction location by gravity.

In this embodiment, a linkage guide is connected to the first jaw. The linkage comprises a guide follower operatively associated with the guide such that the guide guides the follower for tilting the ejector when the jaws move to the open position. The preferred follower comprises a pin.

The present invention provides an ejection device that can eject a substance or cartridge without a catapulting effect, permitting the cartridge to be slipped into a waste bin incorporated into the machine.

BRIEF DESCRIPTION OF THE DRAWINGS

The remainder of the description is given with reference to the drawings in which.

DETAILED DESCRIPTION OF THE PREFERRED EMBODIMENTS

Figure 1:
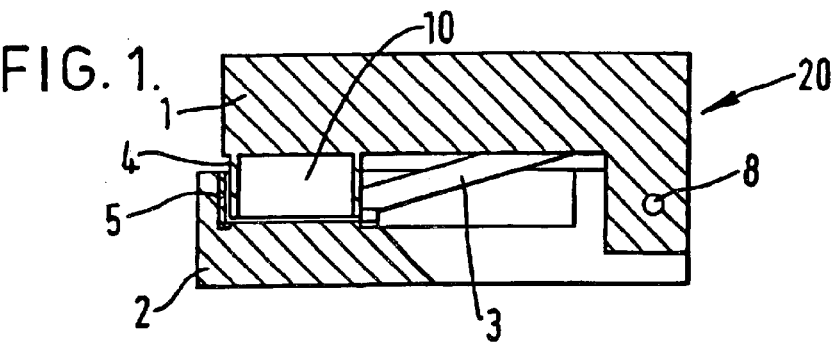
FIG. 1 is a cross-section of the device with the jaws closed.

The present invention therefore relates to a device for ejecting a cartridge of a coffee machine comprising jaws with a fixed part and a moving part, the said jaw parts forming, in the closed position, a housing for the said cartridge on the front of the said jaws, the moving part being mounted so that it can rotate on the rear of the fixed part, the said device comprising, on the fixed part, in the region of the cartridge housing, an ejector and a pulling arm mounted on the moving part above the axis of rotation of the said moving part with, at the end of the said arm, a first pin designed to collaborate with catch members of the ejector.

The pin provided on the pulling arm may have any possible geometrical shape. This pin preferably has a cylindrical shape so that it catches well in the catch members, which thus have a shape that complements that of the pin.

It is possible, in the device according to the invention, to extract closed or open cartridges. By way of closed cartridges, it is possible to envisage the cartridges that form the subject of Patent EP 512 468 and EP 620 203. However, there is no limitation on also being able to use the device according to the invention for other containers, such as sachets, cartridges, or capsules that are open or closed. It is also possible to use the device according to the invention for open capsules, for example capsules made of plastic or sachets made of filter paper and of nonwovens.

The device according to the invention may also be incorporated into any type of coffee machine designed for cartridge or sachet extraction. It would be possible, for example, to incorporate the device into the machine that is the subject of U.S. Pat. application Ser. No. 10/084,617, the content of which is incorporated herein by reference thereto.

The ejector of the device according to the invention consists of a flat annular system comprising the catch members on a part of the said annular system. These catch members are preferably located on the side of the said annular system and at right angles to the axis of rotation of the said ejector. The axis of rotation of the ejector is arranged just behind the cartridge housing, for example at a distance of between 5 and 15 mm away from the housing.

In a preferred embodiment, the pulling arm comprises a second pin at the same level as the first pin, this second pin being designed to collaborate with a guide cam of the fixed part of jaws. As with the first pin, this may have any possible geometric shape. As a preference, it has a cylindrical shape identical to that of the first pin. The guide cam of the fixed part of the jaws has an aperture which just allows the said second pin to be introduced and to move therein. This cam provides the pulling arm with good guidance so as to have good ejection and good return of the ejector to the initial position.

When the jaws open, it is necessary that the cartridge should not rise up with the moving part of the jaws. The capsule needs to remain in the housing in the fixed part of the jaws. To achieve this, means for retaining the capsule are provided on the ejector. These means may be of any kind. For example, it is possible to use the retaining means which are the subject of U.S. Pat. No. 6,026,732, the content of which is incorporated herein by reference thereto. Consideration is normally given to a coffee machine with fixed and moving parts of the order of 10 to 30 cm long.

The catch members on the one hand, allow the jaws to open and then they allow the used cartridge to be ejected. They therefore consist first of all of a recess allowing the pin to slide, and then of a hook, allowing the pin to lift the ejector correctly.

Figure 2:
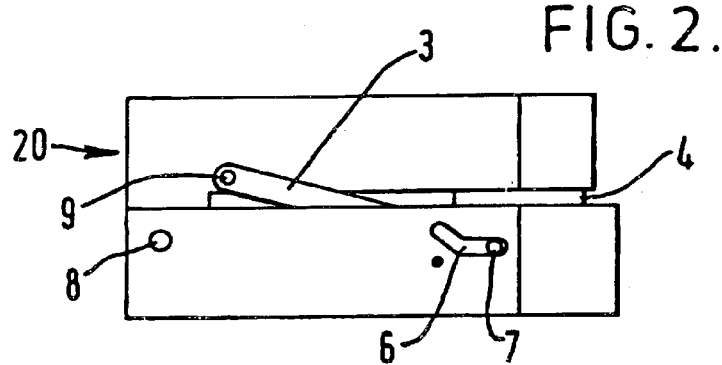
FIG. 2 is a diagrammatic view of FIG. 1, from the other side.
Figure 3:
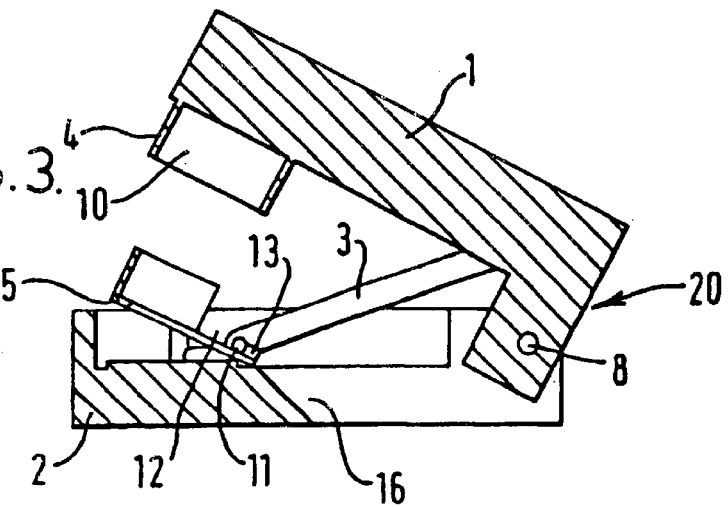
FIG. 3 is a cross-section of the device as it opens.
Figure 4:
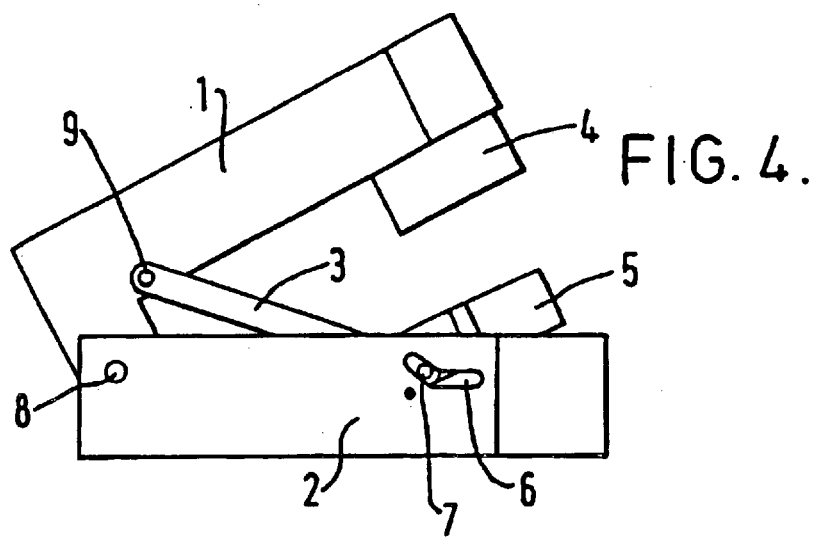
FIG. 4 is a diagrammatic view of FIG. 3, from the other side.
Figure 5:
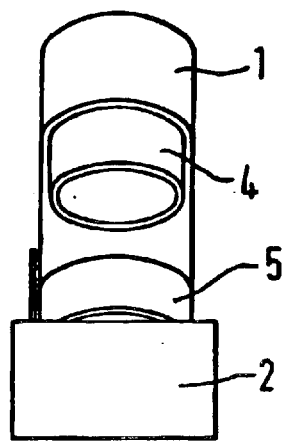
FIG. 5 is a diagrammatic face-on view of FIG. 3.
Figure 6:
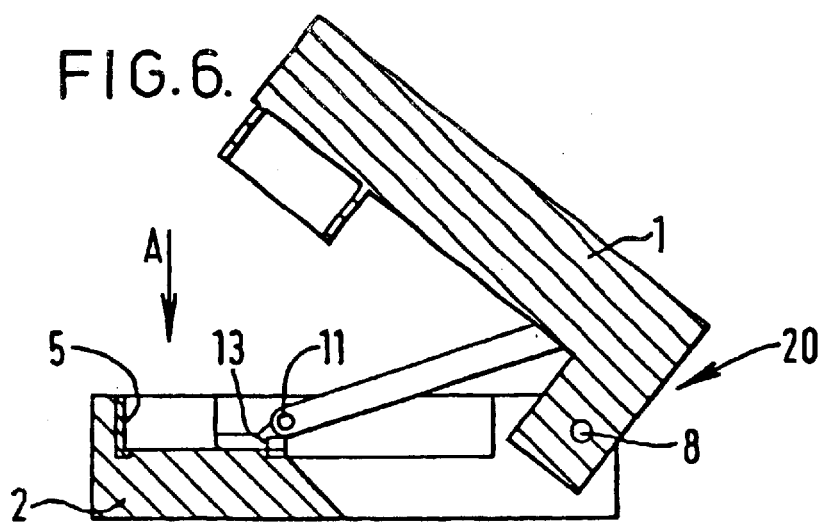
FIG. 6 is a cross-section of the device, fully open.
Figure 7:
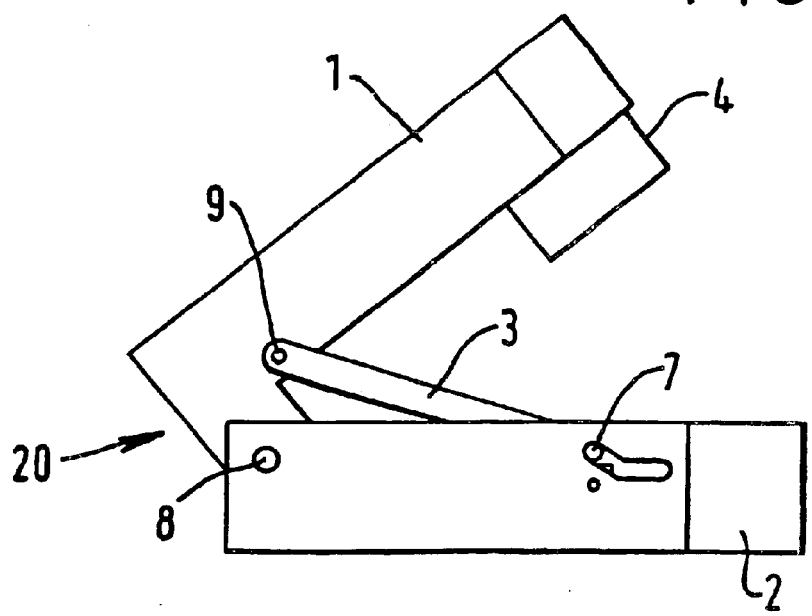
FIG. 7 is a diagrammatic view of FIG. 6, from the other side.

FIGS. 1 and 2 show the device closed, FIGS. 3 to 5 show the device partially open, and FIGS. 6 and 7 show the device fully open. The jaws (20), with moving part (1) and fixed part (2), open and close about an axis of rotation (8). A linkage, preferably including a pulling arm (3) with the second pin (7) in the guide cam (6) can be clearly seen. This arm (3) rotates about the axis (9). The housing (10) for the cartridge is formed by virtue of the cage (4) on the moving part (1) of the jaws (20) and defines an extraction chamber with the ejector (5) and the fixed part (2). The ejector (5) is moved in rotation about the axis (14) by virtue of the pin (11) of the pulling arm (3). The dogs (11) and (7) lie one in the continuation of the other. They are normally of cylindrical shape. The ejector has a recess (12) and a catch, such as a hook (13), to allow the said ejector to pivot with the arm (3).

The way in which the device according to the invention works is as follows: the consumer places the cartridge for extraction (not depicted) on the fixed part (2) of the jaws (20) in the region of the ejector (5), with the jaws in the open position. He then closes the machine using the device, not depicted, that is the subject of the aforementioned U.S. patent application Ser. No. 10/084,617: the cartridge is in the housing (10) formed by the cage (4). He performs cartridge extraction in a manner known in the art. The consumer then acts, in order to open the jaws, on the opening means which are the subject of the aforementioned patent application. In lifting, the moving part (1) of the jaws (20) carries along the arm (3) and also the pin (11) at the end of the said arm. As the jaws open, the lower edge of the cartridge is retained by means (17) so that it does indeed remain on the ejector (5). In the first part of its travel, the pin slides along the recess (12) of the ejector (5) and when it reaches the position of FIGS. 3 to 5, the said pin (11) follows the interior shape of the hook (13) and lifts the ejector (5). At this moment, the cartridge slides down the chute (16) to the waste bin. When the ejector is high enough up, the pin (11) uncatches from the hook (13) and the ejector drops back down into the position of FIGS. 6 and 7. The guide cam (6) with its pin (7) provides good guidance for the pin (11) in the ejection and while the ejector (5) is dropping back down.

Figure 8:
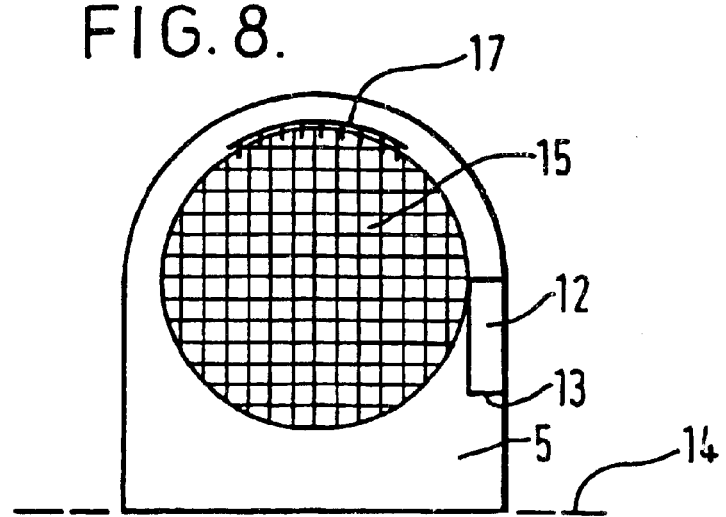
FIG. 8 is a diagrammatic depiction of the ejector viewed from above.

FIG. 8 is a view in the direction of arrow A (FIG. 6) giving a clear view of the ejector. This figure very clearly shows its annular shape and the recess (12) and the hook (13) for ejection. The plate (15) is a separate part which comprises recessed and raised elements in the event of closed cartridge extraction. The retaining means (17) form an integral part of the ejector and are arranged on the front of the fixed part (2) of the jaws (20). As shown in this figure, the axis (14) is spaced from the center of the extraction cavity by a distance of less then about the length of the extraction cavity in the direction of said distance. In this embodiment, axis (14) is spaced from the center of the extraction cavity by a distance of less then the length of the extraction cavity in the direction of this distance. Also, axis (14) is closer than about half of the distance between the center of the extraction chamber and the axis (8), and less than about a third of this distance, and is less than or around about a quarter of this distance.

The device according to the invention can be used on any type of coffee machine comprising a type of extraction for ready-to-use doses. While illustrative embodiments of the invention are disclosed herein, it will be appreciated that numerous modifications and other embodiments may be devised by those skilled in the art. Therefore, it will be understood that the appended claims are intended to cover all such modifications and embodiments that come within the spirit and scope of the present invention.

What is claimed is:

1. A food dispenser for extracting a substance for preparing a fluid food product, comprising:

first and second jaws movably connected together and comprising an open position for receiving the substance between the jaws and a closed position in which the jaws cooperatively define an extraction chamber about the substance at an extraction location between the jaws, the extraction chamber being configured for extracting a food product from the substance; and an ejector operatively associated with the first jaw for tilting with respect thereto substantially about a tilt axis that is sufficiently close to the extraction chamber for ejecting the substance from the extraction chamber substantially without catapulting the substance when the jaws are moved from the closed to the open position, the ejector comprising raised and recessed elements for extracting the mixture from a cartridge in the extraction cavity.

2. The dispenser of claim 1, wherein the ejector is operatively associated with the jaws such that motion of the jaws from the closed position causes the tilting of the ejector.

3. The dispenser of claim 1, wherein the tilt axis spaced from the center of the extraction chamber by a distance of less then about the length of the extraction chamber in the direction of said distance.

4. The dispenser of claim 1, wherein:

the first and second jaws are pivotally connected for pivoting about a jaw pivot axis; and the tilt axis is closer than about half of the distance between the center of the extraction chamber and the pivot axis.

5. The dispenser of claim 4, wherein the tilt axis is disposed substantially between the jaw pivot axis and the extraction chamber.

6. The food dispenser of claim 1, wherein:

the jaws in the open position are configured for receiving a cartridge that contains the substance;

the extraction chamber is configured for receiving the cartridge at the extraction location; and the ejector comprises a cartridge ejector configured for ejecting the cartridge in response to movement of the jaws from the closed to the open position.

7. The dispenser of claim 1, further comprising a ramp disposed adjacent the ejector and associated therewith for receiving and directing the ejected substance to a disposal location.

8. The dispenser of claim 1, further comprising a linkage connected with the second jaw and the ejector for causing the ejector to move for ejecting the cartridge when the second jaw is moved with respect to the first jaw to the open position.

9. The dispenser of claim 1, wherein the tilt of the ejector is sufficient for causing the substance to slide out from the extraction location by gravity.

10. The dispenser of claim 1, wherein the first jaw is substantially fixed against rotation.

11. The dispenser of claim 1, wherein:

the ejector comprises an ejecting position for ejecting the substance, and a receiving position for receiving the substance; and the ejector has an operative association with the jaws such that movement from the closed position of the jaws causes the ejector to move to the ejecting position, and further movement of the jaws to the open position causes the ejector to move to the receiving position.

12. The dispenser of claim 1, wherein the extraction chamber is configured for feeding a fluid to the substance and extracting a mixture of the fluid and the substance.

13. The dispenser of claim 1, wherein the food comprises a beverage component, and the mixture comprises a beverage.

14. A food dispenser for extracting a substance for preparing a fluid food product, comprising:

first and second jaws movably connected together and comprising an open position for receiving the substance between the jaws and a closed position in which the jaws cooperatively define an extraction chamber about the substance at an extraction location between the jaws, the jaws comprising a chamber wall defining the extraction cavity, and the extraction chamber being configured for extracting a food product from the substance; and an ejector operatively associated with the first jaw for tilting with respect thereto substantially about a tilt axis that is sufficiently close to the extraction chamber for ejecting the substance from the extraction chamber substantially without catapulting the substance when the jaws are moved from the closed to the open position, and the ejector comprising an ejector wall disposed outside the chamber wall in the closed position for positioning the substance in the extraction location with the jaws in the open position.

15. The dispenser of claim 14, wherein the ejector wall has a shape substantially corresponding to the chamber wall.

16. A food dispenser for extracting a substance for preparing a fluid food product, comprising:

first and second jaws movably connected together and comprising an open position for receiving the substance between the jaws and a closed position in which the jaws cooperatively define an extraction chamber about the substance at an extraction location between the jaws, the extraction chamber being configured for extracting a food product from the substance;

an ejector operatively associated with the jaws for ejecting the substance from the extraction chamber location when the jaws are moved from the closed to the open position; and a linkage connected operatively connected between the first and second jaws for moving with respect to the ejector for causing the ejector to eject the cartridge when the second jaw is moved with respect to the first jaw from the closed position, wherein the linkage comprises an tilter portion, and the ejector comprises a catch, the tilter portion and the catch being associated such that:

the tilter portion moves with respect to the catch during a phase of the movement of the jaws from the closed position, and thereafter the tilter portion comes into contact with the catch during further movement of the jaws from the closed to the open position to bias the catch for causing the ejector to pivot to an ejecting position for ejecting the substance, and the tilter portion disengages from the catch upon further movement of the jaws from the closed position, causing the ejector to a receiving position for receiving the substance.

17. The dispenser of claim 16, wherein the linkage is configured for causing the ejector to tilt about a tilt axis for ejecting the cartridge when the second jaw is moved with respect to the first jaw to the open position, wherein the tilt axis is sufficiently close to the extraction chamber for ejecting the substance therefrom substantially without catapulting the substance.

18. The dispenser of claim 17, wherein the tilt axis spaced from the center of the extraction chamber by a distance of less then about the length of the extraction chamber in the direction of said distance.

19. The dispenser of claim 16, wherein:

the ejector is tiltably mounted to the first jaw; and the tilter portion comprises an arm pivotally connected to the first jaw and movable along a guide with respect to the second jaw for giving the tilter portion to contact with the catch.

20. A food dispenser for extracting a substance for preparing a fluid food product, comprising:

first and second jaws movably connected together and comprising an open position for receiving the substance between the jaws and a closed position in which the jaws cooperatively define an extraction chamber about the substance at an extraction location between the jaws, the extraction chamber being configured for extracting a food product from the substance;

an ejector operatively associated with the jaws for ejecting the substance from the extraction chamber location when the jaws are moved from the closed to the open position;

a linkage connected operatively connected between the first and second jaws for moving with respect to the ejector for causing the ejector to eject the cartridge when the second jaw is moved with respect to the first jaw from the closed position; and a linkage guide associated with the first jaw, wherein the linkage comprises a guide follower operatively associated with the guide such that the guide guides the follower for tilting the ejector when the jaws move to the open position.

21. The dispenser of claim 20, wherein the linkage comprises an tilter portion, and the ejector comprises a catch, the tilter portion and the catch being associated such that:

the tilter portion moves with respect to the catch during a phase of the movement of the jaws from the closed position, and thereafter the tilter portion comes into contact with the catch during further movement of the jaws from the closed to the open position to bias the catch for causing the ejector to pivot to an ejecting position for ejecting the substance; and the tilter portion disengages from the catch upon further movement of the jaws from the closed position, causing the ejector to a receiving position for receiving the substance.

22. The dispenser of claim 21, wherein the catch comprises a portion that extends generally upright with respect to the first jaw.

23. The dispenser of claim 20, wherein the follower comprises a pin.

* * * * *